April 30, 1935.    G. E. HOWARD    1,999,761
METHOD OF AND APPARATUS FOR MAKING GLASS
Filed Oct. 24, 1932
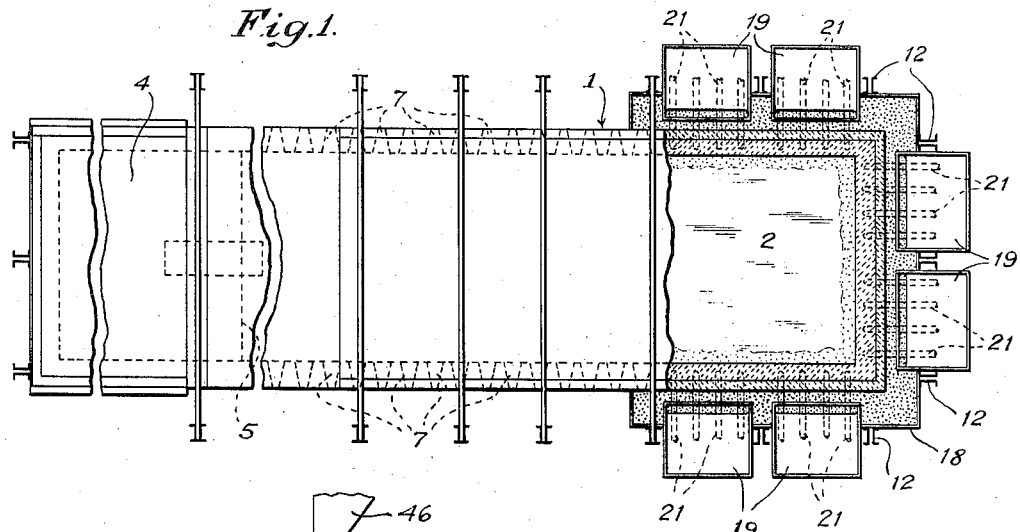
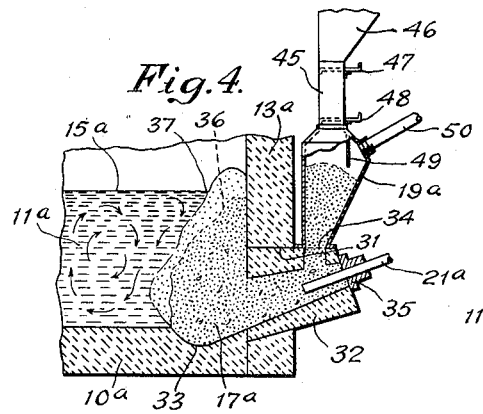
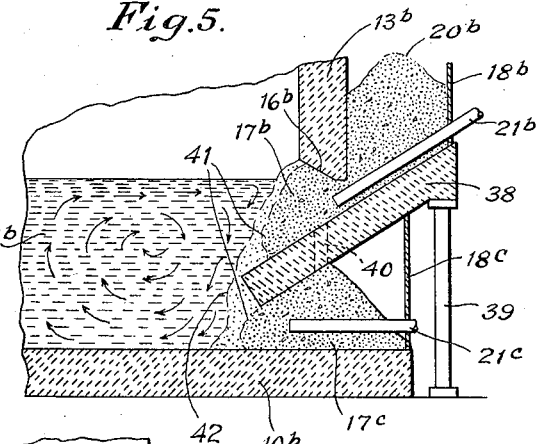
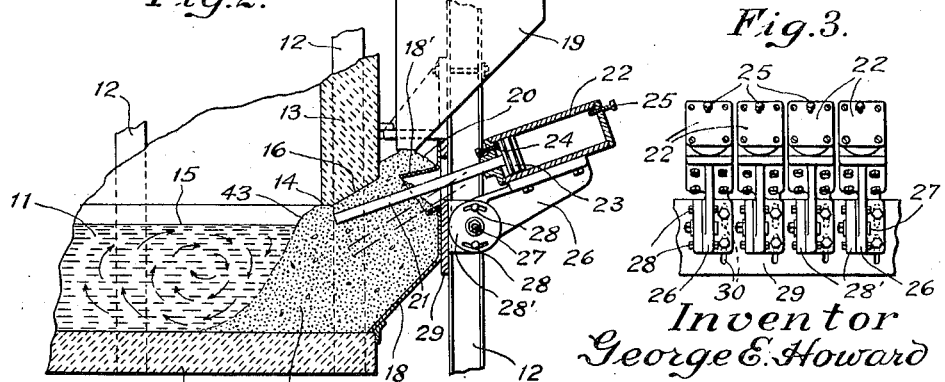
Witness:
A. A. Horn
Inventor
George E. Howard
by Brown & Parham
Attorneys.

Patented Apr. 30, 1935

1,999,761

UNITED STATES PATENT OFFICE 1,999,761

METHOD OF AND APPARATUS FOR MAKING GLASS

George E. Howard, Butler, Pa., assignor to Hartford-Empire Company, Hartford, Conn., a corporation of Delaware Application October 24, 1932, Serial No. 639,216

17 Claims. (Cl. 49—54)

This invention relates to a method of and apparatus for making glass, and more specifically to such a method and apparatus as include the substitution for a portion of the walls of a glass melting tank by the materials which are to be melted and made into glass, and the melting of such materials to a material extent by heat which in previous methods and apparatus was allowed to escape through the walls which according to this invention are replaced by the glass-making materials.

In the glass tanks of the prior art, one of the chief sources of heat loss is through the walls of the tank, especially those below the level of the glass therein, as it is difficult properly to insulate these walls due to the necessity of constructing them of a plurality of blocks or bricks having joints therebetween and the consequent difficulty of preventing glass from escaping through these joints unless they are maintained relatively cool on the outside in order to freeze the glass therein. This requires a substantial temperature drop through the walls and the consequent loss of a material amount of heat. Another difficulty which has attended the melting of glass in previously known equipment is that the molten glass in contact with commercial refractory materials is relatively corrosive, so that the material of the walls, especially the side walls, is relatively rapidly corroded or eroded away, with the result that the tank must be drained and the worn walls replaced at frequent intervals.

A primary general object of my present invention is, therefore, to overcome the above mentioned difficulties of the prior art to as great an extent as is commercially feasible by the substitution for a portion of the glass contacting walls at the sides of tanks by the material which is to be melted and converted into glass, thereby utilizing a large proportion of the heat which is lost according to previous practices in performing useful work in melting the glass-making materials to form glass, and further by reducing the cost of replacing the wall members used by the prior art by omitting certain at least of such walls and using in their place the glass-making material which is to be melted and which therefore it is desired to have continuously melted off or "eaten away" in operating the tank as a continuous glass-making device.

Among the other and more specific objects of my invention are the provision of a method of and means for controllably forcing the glass-making materials used as glass contacting and confining walls inwardly of the tank to compensate for those portions thereof which are continuously being melted to form glass, and more specifically to provide such pusher means of reciprocable character in which the length and position of the stroke are controllable and in which the direction of the pushing force, particularly as regards its angle to the horizontal, is controllable.

A further specific object of the present invention is to provide a method and means operative differentially at different levels intermediate the normal level of the surface of the bath of molten glass and that of the bottom thereof, for forcing the mass of glass-making materials forming the confining wall for the bath inwardly thereof, particularly in order to provide for the maintenance of a condition in which the line or zone between the molten glass of the bath and the dry glass-making materials may be maintained substantially constant and/or established and maintained at any predetermined desired position.

One of the most serious problems which must be solved in the practice of the methods of my present invention and for the solution of which provision must be made in the design and construction of apparatus for carrying out such methods is the danger of undercutting of the walls of glass-making materials by the molten glass of the bath in contact therewith and the consequent floating of the glass-making materials due to their lower specific gravity than that of molten glass.

A further object of the present invention is, therefore, to provide a method and apparatus by which this problem may be solved, particularly by providing for the maintenance of a portion of the wall of glass-making material always completely down to the level of the bottom of the bath of molten glass and by providing for adequate replenishment of the dry glass-making materials at that point, thus preventing the possibility of any substantial undercutting of the dry material of the wall by the molten glass.

A still further object of the invention is to provide a method and a means in conjunction with the method and means heretofore referred to for applying sub-atmospheric pressure to the glass making materials outside the tank in order to withdraw therefrom at least a part of the included air and at least a part of the gases generated incident to the conversion of the glass-making materials into glass within the tank, thus reducing the amount of the gases which are released within the tank which must be heated from substantially room temperature to the high temperature of the waste gases leaving the tank. This effects a direct saving in the fuel cost required to operate the tank for a given capacity. Incident to these provisions of method and apparatus, it is further desired that a method and means be provided for introducing additional glass making materials into the chamber to which the vacuum or sub-atmospheric pressure is applied without interrupting the continuous application of sub-atmospheric pressure. Such provisions are made by the present invention.

Other objects and advantages of the present invention will become more apparent from a reading of the following specification and subjoined claims when taken in connection with the accompanying drawing in which are illustrated several embodiments of my invention.

In the drawing:

Figure 1 is a foreshortened plan view with certain parts broken away and in horizontal section and other parts omitted, showing the application of my invention to a glass melting tank;

Fig. 2 is a fragmentary view in vertical section of a portion of the device of Fig. 1 showing in detail one form of device in which a wall of glass-making materials may be established and maintained to confine within a tank a bath of molten glass, and also showing pusher mechanism and its actuating and adjusting means;

Fig. 3 is a fragmentary elevational view which may be considered as taken from the right of the structure shown in Fig. 2, showing a bank of pusher mechanisms and their manner of mounting;

Fig. 4 is a view similar ot Fig. 2, but of another embodiment of my invention, the actuating means for the pusher being omitted, this figure also illustrating the application of vacuum to the glass-making materials outside the tank; and Fig. 5 is a view similar to Figs. 2 and 4, but showing a further embodiment of my invention in which two pusher mechanisms are used one above the other, and in which an intermediate wall of refractory material is used separating two wall portions made up of the glass-making materials, all of which together confine the molten glass.

Referring to the form of the invention shown in Figs. 1 to 3 inclusive, there is more or less diagrammatically illustrated a glass melting tank I divided into two compartments 2 and 4 by a bridge wall 5. The function of these two chambers is in general substantially those performed by similar chambers in the prior art. The chamber 2 referred to as the melting chamber is designed and used for the fusion, melting and refining of the glass, while chamber 4 operates as a tempering, settling and working-out chamber. Suitable heating means for applying heat of combustion to the surface of the glass bath maintained in the chamber 2 are indicated diagrammatically by the two series of burner ports 7. The heating means employed in said furnace may, however, be of any well known kind including electrical means, and may be so regulated and controlled as to effect the desired heat conditions and heat gradient throughout the melting chamber.

The structure of the forward portion of the chamber 2, the chamber 4 and bridge wall forms no part of the present invention, and may be of any conventional type in which the chambers are built up of suitable refractory blocks. The invention of the present application is particularly illustrated as applied to the rearward end of the chamber 2, and comprises the novel wall structure and batch feeding arrangements by which substantial portions of the glass bath enclosing walls may be formed of progressively and substantially continuously replenished glass making materials. The general arrangements of this rear end of the chamber 2 may be applied as desired to any suitable portion of the melting chamber. It is particularly desirable to apply such arrangements at those points at which the greatest heat exists and/or at which there is the greatest chemical and physical activity in the glass bath.

The extent to which the walls of the melting end of the tank are made up of glass making materials rather than refractory materials should be so related to the capacity of the furnace and the rate of melting and the rate of feed of batch that these walls may be constantly maintained to enclose the bath present in the furnace and to supply new glass making materials substantially at the rate at which such materials are converted into glass and at which the glass is withdrawn from the furnace.

The rearward portion of the chamber 2, to which my novel features may have been applied, is formed of the usual bottom wall 10, and side walls 13 of refractory material, the latter walls depending from the usual top arch to a point adjacent to the normal glass level of the bath. At least a part of the side and end walls of this portion of the structure which contain the molten glass bath 11 are formed of dry glass making materials and/or batch, as is best illustrated in Fig. 2, wherein is shown the tank bottom 10, and the depending side wall portion 13 extending downwardly from the roof of the tank to the level 14 slightly above the level 15 at which it is desired to maintain the molten glass in the tank.

The lower edge of the wall 13 is beveled downwardly and inwardly as illustrated at 16. A mass or wall 17 of glass-making materials or batch serves as a substitute for the lower side wall portions of previous tanks in confining the bath of glass 11 within the desired bounds. The batch or glass-making materials of the wall 17 are confined against movement outwardly of the tank by a suitable wall 18 supported in any desired manner by the tank and/or by the frame members 12 and constructed of any suitable material. As shown, the wall 18 is of relatively light sheet metal, although it will be understood that any desired material, even some glass contact refractory, may be used.

Means are provided for supplying glass-making materials or batch to the wall 17, such means including a plurality of hoppers 19 disposed at intervals about the tank, so that a head of glass making materials or batch may be maintained at a level 20 substantially above that of the normal level 15 of the glass in the tank. In this way the pressure on the lower portion of the wall 17, due to the head of the glass-making materials up to the level 20, will tend to balance the hydrostatic pressure of the bath of molten glass 11 and thereby prevent undercutting of the wall, that is, prevent the molten glass from working under the wall 17 and causing this wall or portions thereof to float upon the surface of the bath. It will be understood that the hoppers 19 are suitably supported, as by the frame members 12, in any desired manner, and will be suitably supplied with glass making materials or batch by any desired means either manual or automatic.

Means are provided for exerting force upon the glass-making materials of the wall 17 to force such materials inwardly of the tank and to maintain the integrity of the wall in confining the molten glass within the desired bounds. Such means include a plurality of pusher members 21 here shown as reciprocable rods, which serve by their reciprocation to force the glass-making materials or batch inwardly of the tank. The pusher members or rods 21 pass through the side walls 18 which confine the batch masses 17 and may be operated by any suitable means appropriately connected thereto. Such operating means in the present instance are shown as pneumatic cylinders 22 having pistons 23 directly connected to the rods 21. Means are provided for determining both the longitudinal position and length of the stroke of the members 21, comprising adjustable stop bolts 24 and 25 threaded into the opposite ends of the cylinders 22 respectively. In this way the application of the forces tending to push the glass-forming materials inwardly of the tank may be controlled as desired.

The rear wall 18 confining the batch mass 17 may be provided with inwardly directed sleeves 18' through which the rods 21 pass. The angle and position of the inner end of these sleeves are such as compared to the angle of repose of the glass-making materials that these materials will not flow or be moved out through the slot to any appreciable extent, while maintaining the slot always open to provide a minimum of frictional resistance against movement of the pusher member 21.

It is also desirable, if not necessary, in maintaining a batch wall contiguous with a bath of molten glass, that there be means for differentially applying force tending to push portions of the wall at different levels inwardly toward the molten glass and thus to maintain the line or zone of contact between the molten glass and the dry glass-making materials substantially constant as to position. As shown in Fig. 2, I accomplish this result by mounting the cylinders 22 for angular adjustment about horizontal axes, so as to vary the direction of application of the pushing force with respect to the horizontal, and likewise vary the point of application thereof. The cylinders 22 are shown as secured to brackets 26 which are mounted for adjustment about horizontal pivots 27 and are adapted to be locked in adjusted position by means of screws 28 passing through arcuate slots in fixed supporting brackets 28' and threaded into brackets 26. Brackets 28' are suitably secured to a cross member 29 preferably with provision for vertical adjustment with respect thereto. As shown (Fig. 3), the member 29 is provided with vertically elongated openings 30 through which pass bolts securing the brackets 28' to the member 29, so that brackets 28' may be secured to the cross member 29 in any desired vertically adjusted position. The cross member 29 may be suitably supported by the structural members 12 or in any other desired manner.

Thus the cylinders 22 may be individually angularly adjusted about the axes 27 and furthermore these cylinders may be individually vertically adjusted by varying the position of their corresponding brackets 28' with respect to the member 29. Two adjusted positions for the path or stroke of the pusher member 21 are shown at the full and dotted line positions of that member in Fig. 2. In this way the position and direction of application of the force tending to move the batch or glass-making materials inward may be independently controlled as desired, and the materials may be forced inwardly to maintain the wall 17 constant as to position and volume, and likewise to maintain the line or zone dividing this dry mass of glass-making materials from the molten glass 11 substantially constant as to position and form. Also by suitably forcing the glass making materials forward adjacent to the bottom of the pool, undercutting of the wall of such materials by the molten glass may be substantially completely prevented. The line or zone dividing the molten glass from the dry batch or glass-making materials will be a constantly moving layer of material of varying viscosity which will tend to move outwardly of the furnace due to the progressive penetration of heat and the melting off of the glass-making materials to form glass, and will be constantly moved inwardly due to the forward movement of the glass-making materials inwardly of the furnace substantially to balance this heat penetration. It is thus somewhat analogous to a rubber blanket which may stretch or bend or be warped, but will not break, thus confining the molten glass within the desired bounds.

Referring now to Fig. 4, I have shown another form of my invention wherein corresponding reference characters refer to like parts. There is illustrated a portion of a glass melting tank including a bottom 10a for containing a glass bath 11a and having a confining wall 17a of glass making materials contiguous with the bath 11a. In this form of the invention the side wall 13a extends downwardly to the bottom of the tank and is provided near the level of the bottom of the glass bath 11a with a horizontally elongated aperture 31 in which is received a block 32. Extending through the block 32 is a horizontally elongated chamber which is Y-shaped in the vertical sectional showing of Fig. 4, the stem of the Y communicating with the interior of the tank adjacent to the bottom thereof and having its lower wall formed as a continuation of the contour of a recess 33 formed in the bottom 10a of the tank.

Means are provided for supplying glass-making materials or batch to the upwardly extending branch 34 of the Y-chamber in the member 32, such means including a completely enclosed hopper 19a to which glass making materials or batch may be supplied through a passage 45 from a suitable source of supply as the hopper 46. The passage 45 is provided with a pair of spaced damper members 47 and 48, which are adapted to be alternately opened and closed to permit the introduction of glass-making materials or batch into the interior of the closed hopper 19a without disturbing the existing pressure conditions therein. Communicating with the chamber 19a to the rear of a baffle member 49 is a pipe 50 which is adapted to be connected with a suitable source of sub-atmospheric pressure or vacuum.

The purpose of the establishment of sub-atmospheric pressure within the closed hopper 19a is to provide for the exhausting from the glass-making materials of a portion at least of the included air, and also at least partially to withdraw through the mass or wall 17a of glass making materials the gases evolved from such materials during the transition thereof into molten glass. This exhaustion of gases serves to reduce the volume of gases which must be heated up by the heating means provided from substantially room temperature to the temperature of the gases exhausted from the tank, which in practice may effect a material saving in the amount of fuel required to maintain a desired rate of melting in the tank. Thus, by the means provided, a material proportion of these gases will be exhausted from the glass making materials or batch, while at the same time the introduction of glass-making materials to the hopper 19a is permitted at any desired times by suitable manipulation of the valves 47 and 48. The baffle 49 serves to prevent the glass making materials being supplied to the hopper 19a through the passage 45 passing outwardly to the vacuum creating apparatus through the pipe 50.

The glass-making materials are forced inwardly by a reciprocating rod 21a extending through a suitable bearing member 35 forming a boundary of the other branch of the Y-chamber in the block 32. In this instance, no provision is made for varying the angular position of the stroke of the member 21a. The glass making materials will be forced into the tank and formed in a mass or wall 17a which will extend upwardly due to the flowable character of the materials substantially to the normal level 15a of the glass in the tank, and possibly above it, as illustrated in the drawing. I have shown at 36 and 37 two possible boundaries or zones between the dry glass-making materials and the molten glass 11a in the tank, the actual boundary existing at any time depending upon the rate of feed of the glass making materials to the tank and the rate of melting thereof, which in turn is determined by the amount and temperature of the molten glass in the tank. Due to the provision of the recess 33 in the bottom of the tank and to the downward forcing of the glass making materials into and through this recess, substantial undercutting of the mass or wall 17a by the molten glass will be prevented.

Referring now to Fig. 5, I have shown another embodiment of my invention comprising a glass tank having a bottom 10b for holding a bath of glass 11b and including a depending wall 13b corresponding generally to the wall 13 of Fig. 2, but differing therefrom in that the bottom edge 16b thereof is inclined inwardly and upwardly instead of outwardly and upwardly. In this embodiment the bottom 10b of the tank extends further outward from the tank proper than in the preceding figures, and serves to support a portion of the batch mass or wall which holds the glass bath confined within the desired bounds. Intermediate the lower edge of the wall 13b and the bottom 10b of the tank is a downwardly and inwardly inclined wall 38 which may be supported in any suitable manner, as for example by the standards 39, and preferably also by lateral supports (not shown). The wall 38 is adapted to divide the batch wall into upper and lower portions 17b and 17c respectively. These portions are prevented from movement outwardly of the tank by retaining walls 18b and 18c respectively, which as shown are similar in construction to the wall 18 described for Fig. 2 and which may similarly be constructed of any desired material including glass contact refractory. Glass making materials may be fed from any suitable source of supply (not shown) to replenish the wall portion 17b and to maintain a level of the materials up to the point 20b for the batch mass or wall 17b. These materials may pass through an aperture or slot, shown in dotted lines at 40, through the inclined wall 38 to supply and maintain the mass or wall 17c. In this instance two pusher elements or rods 21b and 21c are shown for the batch masses or walls 17b and 17c respectively, it being understood that the operation of these rods will be substantially as shown and described for the Fig. 2 embodiment of the invention. In the Fig. 5 form of the invention no provisions are illustrated for varying the angle or position of the stroke of the pushing elements 21b and 21c, but it will be understood that some such means may be used if desired in the same or similar manner as above described in connection with the Fig. 2 form of the invention.

The glass-making materials or batch are forced downwardly and inwardly in this instance by the upper pusher member 21b, and are forced directly inwardly by the lower pusher member 21c. In this form of the invention two different pushers are shown for use simultaneously to accomplish the result obtained only by adjustment in the case of the Fig. 2 form of invention; that is, this form of my invention provides independently adjustable applications of force at different levels intermediate the bottom and top of the bath of glass 11b for the purpose of maintaining the wall of glass making materials as desired. In the Fig. 5 form of the invention, there are shown two possible lines of demarcation at 41 and 42 respectively at which it may be considered that molten glass and dry glass-making materials meet depending on the manner of operation of the tank. It will be understood, however, that there is in practice no sharp line dividing molten glass from dry glass making materials, but that in passing from one to the other the glass becomes more and more viscous and finally less and less plastic. Changes in the position of this line or zone of demarcation will thus be dependent upon the rate at which the glass making materials are forced into the tank as contrasted with the rate of melting of the glass from the walls.

In all the embodiments of my invention the heat for melting the glass-making materials will be transmitted predominantly through the glass itself by radiation and conduction and to a minor extent by direct convection to such portions of the glass-making materials as may project above the normal level of the glass in the tank, for example, as shown at the portion 43, Fig. 2. The glass in the tank will of course be hottest at the top in an embodiment of the invention in which heat is supplied by combustion. This hot glass will circulate to the sides of the tank where it is relatively cool and there flow downwardly along the surface of the glass-making materials melting some of these materials off and combine them with the circulating current of glass, thence inwardly of the tank toward the hottest region thereof, and thence upwardly again at this hot region. This will occur according to the well known laws of thermo-siphon circulation. I have illustrated the course of this circulation by the arrows within the bath of molten glass. The heat which is given up by the glass as it cools and flows downwardly along the surface of the mass or wall of glass forming materials will be utilized in melting some of those materials and converting them into glass. The circulation set up as aforesaid will be effective in homogenizing the glass and in assisting in the elimination of the gaseous matter which is given off by the glass-making materials incident to their conversion into glass. At the same time, the corrosive action of the melting glass will be effective not against refractory materials as in the prior art, but against a mass of glass-making materials which it is desired to melt, and therefore will be an advantage rather than a disadvantage.

In the above description and appended claims, I have referred to "glass", meaning thereby not "glass" in its restrictive sense, but rather any glass-like materials in a broad sense, as any material which may be made by fusing together dry glass making materials and in which the same or similar problems arise as in the manufacture of what is strictly termed "glass". Among such other materials which may be considered as within the purview of my invention are water glass, vitreous enamels, etc., and the present specification and claims are to be read with this in mind.

Many other modifications may be made, both of my apparatus and methods, than are specifically illustrated in the accompanying drawings and described herein. I do not wish to be limited therefore except by the scope of the appended claims which are to be construed as broadly as the state of the prior art permits.

I claim:

1. The method of making glass, which comprises confining a bath of molten glass in a tank of which at least a portion of the lateral walls confining the bath are made up of the glass making materials which are to be melted and converted into glass and in which such walls of glass making materials extend from a point adjacent to the normal level of the surface of said bath completely to the bottom thereof, supplying heat to said bath, melting the glass making materials of said walls predominantly by heat transmitted thereto through the glass of said bath, maintaining the walls of glass making materials by substantially continuously forcing fresh glass making materials inwardly of the bath at a rate substantially equal to the rate of melting of the material of the walls of glass making materials, whereby the line or zone dividing the molten glass of said bath from the unmelted glass making materials is maintained substantially constant, and preventing substantial undercutting of the walls of glass making materials by the molten glass of said bath by controlling the application of the force which moves the material of said walls inwardly.

2. The method of making glass, which comprises confining at least a portion of the lateral periphery of a bath of molten glass by a wall composed of materials which when melted and refined will produce glass of the desired composition, said wall extending from a point adjacent to the normal level of the surface of said bath completely to the bottom thereof, supplying heat to the glass of said bath, melting off the materials of said wall predominantly by heat transmitted through said bath by conduction and radiation, maintaining said wall substantially constant as to position and volume by substantially continuously moving the materials of which it is composed inwardly and downwardly of said bath while supplying fresh glass making materials to the outside of said wall, controlling the rate of inward and downward movement of the materials of said wall to balance over any extended period of time the rate of melting of the materials therefrom to form glass, and preventing substantial undercutting of the wall of glass making materials by the molten glass of said bath by controlling the application of force tending to force the materials of the wall inwardly and downwardly of the bath.

3. The method of making glass, which comprises confining at least a portion of the lateral periphery of a bath of molten glass by a wall composed of materials which when melted and refined will produce glass of the desired composition, said wall extending from a point adjacent to the normal level of the surface of said bath completely to the bottom thereof, supplying heat to the glass of said bath, melting off the materials of said wall to form glass predominantly by heat transmitted through said bath by conduction and radiation, and maintaining said wall substantially constant as to position and volume by substantially continuously moving the materials of which it is composed inwardly of the bath by the application of force to the materials of said wall variably effective at different levels intermediate the normal level of the surface of said bath and the bottom thereof while supplying fresh glass making materials to the outer portions of said wall.

4. The method of making glass, which comprises confining at least a portion of the lateral periphery of a bath of molten glass by a wall composed of materials which when melted and refined will produce glass of the desired composition, said wall extending from a point adjacent to the normal level of the surface of said bath completely to the bottom thereof, supplying heat to the glass of said bath, melting off the materials of said wall to form glass predominantly by heat transmitted through said bath by conduction and radiation, maintaining said wall substantially constant as to position and volume by substantially continuously moving the materials of which it is composed inwardly of the bath by the application of a force at a variable angle with respect to the horizontal while supplying fresh glass making materials to the outer portions of said wall, and preventing substantial undercutting of said wall by the application of a force to the glass making materials of said wall at a selected angle such that the materials of the wall are forced continually to the lowest level of the bath, whereby the line or zone of contact between the molten glass and the unmelted materials of the wall is maintained substantially constant in position and form.

5. The method of making glass, which comprises confining at least a portion of the lateral periphery of a bath of molten glass by a wall composed of materials which when melted and refined will produce glass of the desired composition, said wall extending from a point adjacent to the normal level of the surface of said bath completely to the bottom thereof, supplying heat to the glass of said bath, melting off the materials of said wall to form glass predominantly by heat transmitted through said bath by conduction and radiation, maintaining said wall substantially constant as to position and volume by substantially continuously moving the materials of which it is composed inwardly of the bath by the application of a plurality of independent forces at different vertical levels between the bottom of the bath and the normal level of the surface thereof while supplying fresh glass making materials to the outer portions of said wall, and preventing substantial undercutting of said wall by the molten glass of said bath by controlling the application of said plurality of forces to maintain the dividing line or zone between the molten glass and the unmelted materials of said wall substantially constant in position and form.

6. The method of making glass, which comprises confining a bath of molten glass in a tank, supplying glass making materials to be melted and converted into glass to said bath at a region below the normal level of the surface thereof so that the glass making materials being supplied serve at least partially to confine the molten glass of said bath, and creating a substantial sub-atmospheric pessure outside the tank and in an enclosed region occupied by said glass making materials being supplied to said bath for abstracting therefrom at least a part of the included air and the gases generated by the conversion of the glass making materials to form molten glass.

7. Apparatus for making glass, comprising a tank for containing a bath of molten glass, an aperture in a lateral wall of said tank adjacent to the bottom thereof, the lower wall of which is inclined downwardly, a recess formed in the bottom of said tank adjacent to said aperture and having a contour in prolongation of the line of the lower wall of said aperture, and means for forcing glass making materials inwardly and downwardly of said tank through said aperture to establish and maintain a mass or wall of glass making materials filling said recess and substantially separating the molten glass of said bath from the adjacent portion of the tank wall, whereby the glass making materials will substantially reduce the loss of heat through the lateral wall portion protected thereby and said wall portion will be protected from erosion by direct contact with the molten glass.

8. Apparatus for making glass, comprising a tank for containing a bath of molten glass, means for supplying glass making materials to be melted and converted into glass to said bath at a region below the normal level of the surface thereof so that the glass making materials being supplied to the bath serve at least partially to confine the molten glass of the bath within the desired bounds, an enclosed chamber outside said tank from which the glass making materials are moved into the interior of the tank, means to supply glass making materials to said chamber, means to move the glass making materials from said chamber to the interior of said tank in a region beneath the normal level of the surface of the molten glass therein, and means for exhausting gases from said chamber.

9. Apparatus for making glass, comprising a tank for containing a bath of molten glass, an aperture in the lateral wall of said tank adjacent to the bottom thereof, the lower wall of which is inclined downwardly, a recess formed in the bottom of said tank adjacent to said aperture and having a contour in prolongation of the line of the lower wall of said aperture, means for forcing glass making materials inwardly and downwardly of said tank through said aperture to establish and maintain a mass or wall of glass making materials filling said recess and substantially separating the molten glass of said bath from the adjacent portion of the tank wall, whereby the glass making materials will substantially reduce the loss of heat through the lateral tank wall portion protected thereby and said wall portion will be protected from erosion by direct contact with the molten glass, an enclosed chamber communicating with said aperture and from which the glass making materials are supplied for movement into the tank through said aperture by said forcing means, means to exhaust gases from said chamber and thus to maintain it at a predetermined sub-atmospheric pressure, and means for introducing glass making materials into said chamber without disturbing said sub-atmospheric pressure.

10. Apparatus for making glass, comprising a tank for containing a bath of molten glass having a melting end and a refining end and including bottom, top and lateral walls of refractory materials, certain portions of the lateral walls terminating adjacent to the normal level of the upper surface of the glass bath, means for maintaining a mass of glass making materials in the spaces between such portions of the lateral walls and the bottom of the tank extending from the level of the bottom of the glass bath to a level adjacent to the normal level of the surface thereof, including means for confining the glass making materials and preventing movement thereof outwardly of the tank, means to supply glass making materials to said mass, pusher means for moving the glass making materials inwardly of the tank to compensate for the melting off of the glass making materials by contact with the molten glass of the bath, means to actuate said pusher means, means including said supply means for the glass making materials for controlling the rate of inward movement of said mass substantially to balance the rate of melting of the glass making materials and to prevent undercutting thereof by the molten glass, whereby the mass of glass making materials is maintained substantially constant as to position and volume, and means to supply heat to the bath of molten glass.

11. Apparatus for making glass, comprising a tank for containing a bath of molten glass having a lateral wall of refractory material, at least a portion of which terminates adjacent to the normal level of the surface of the bath of glass in the tank, means for maintaining a mass of glass making materials in the space between the termination of such portions of the refractory lateral wall and the bottom of the tank extending from the level of the bottom of the glass bath to a level adjacent to the normal level of the surface thereof, including means for supplying glass making materials to the mass from outside the tank and for establishing and maintaining a head of the glass making materials above the normal level of the surface of said bath tending to establish a pressure of said materials to balance the hydrostatic pressure of the molten glass in contact therewith, means for confining the mass of glass making materials and preventing movement thereof outwardly of the tank, pusher means directed inwardly and downwardly of said bath for moving the glass making materials inwardly and downwardly to balance the rate of melting off of said materials by contact with the molten glass and tending to prevent substantial undercutting of the mass of glass making materials by the molten glass, means to control the operation of the pusher means so that in conjunction with the maintained head of the glass making materials the line or zone dividing the dry glass making materials from the molten glass may be maintained substantially constant as to position, and means to supply heat to the bath of molten glass.

12. Apparatus for making glass, comprising a tank for containing a bath of molten glass having a lateral wall of refractory material, at least a portion of which terminates adjacent to the normal level of the surface of the bath of glass in the tank, means for maintaining a mass of glass making materials in the space between the termination of such portion of the refractory lateral wall and the bottom of the tank extending from the level of the bottom of the glass bath to a level adjacent to the normal level of the surface thereof, including means for supplying glass making materials to the mass from outside the tank and for establishing and maintaining a head of glass making materials above the normal level of the surface of the bath tending to establish a pressure of said materials to balance the hydrostatic pressure of the molten glass in contact therewith, means for confining the mass of glass making materials and preventing movement thereof outwardly of the tank, means for exerting pressure variably at different levels upon the mass of glass making materials for moving the materials thereof inwardly of the tank, means for controlling the application of such pressure substantially to balance the rate of inward movement of the glass making materials of the mass against the rate of melting off of materials therefrom to form glass by contact with the molten glass of the bath to the end that the line or zone dividing the dry glass making materials from the molten glass of said bath will be maintained substantially constant as to position, and means to supply heat to the bath of molten glass.

13. Apparatus for making glass, comprising a tank for containing a bath of molten glass having a lateral wall of refractory material, at least a portion of which terminates adjacent to the normal level of the surface of the bath of glass in the tank, means for maintaining a mass of glass making materials in the space between the termination of such portion of the refractory lateral wall and the bottom of the tank extending from the level of the bottom of the glass bath to a level adjacent to the normal level of the surface thereof, including means for supplying glass making materials to the mass from outside the tank and for establishing and maintaining a head of glass making materials above the normal level of the surface of the bath tending to establish a pressure of said materials to balance the hydrostatic pressure of the molten glass in contact therewith, means for confining the mass of glass making materials and preventing movement thereof outwardly of the tank, pusher means directed inwardly and downwardly of said bath for moving the mass of glass making materials inwardly and downwardly substantially to balance the rate of melting off of said materials by the molten glass and tending to prevent substantial undercutting of the mass of glass making materials by the molten glass, means for varying the angle of application of the force exerted by said pusher means with respect to the horizontal, means to control the operation of said pusher means so that in conjunction with the maintained head of the glass making materials, the line or zone dividing the dry glass making materials from the molten glass of said bath may be maintained substantially constant as to position, and means to supply heat to the bath of molten glass.

14. Apparatus for making glass, comprising a tank for containing a bath of molten glass having lateral walls of refractory material, at least some portions of which terminate adjacent to the normal level of the surface of the bath of glass in the tank, means for maintaining a mass of glass making materials in the spaces between the termination of such portions of the refractory lateral walls and the bottom of the tank extending from the level of the bottom of the glass bath to a level adjacent to the normal level of the surface thereof, including means for supplying glass making materials to the mass from outside the tank and for establishing and maintaining a head of the glass making materials above the normal level of the surface of the bath tending to establish a pressure of said materials to balance the hydrostatic pressure of the molten glass in contact therewith, means for confining the mass of glass making materials and preventing movement thereof outwardly of the tank, a plurality of reciprocable pushers disposed about the mass of glass making materials for moving these materials inwardly and downwardly of the bath substantially to balance the rate of melting off of said materials by the molten glass and tending to prevent substantial undercutting of the mass of glass making materials by the molten glass, fluid pressure cylinders for reciprocating said pushers, means for adjustably determining the positions and the lengths of the strokes of said pushers, means for adjustably determining the angles of the paths of said pushers with respect to the horizontal, whereby said pushers acting in conjunction with the maintained head of the glass making materials may be controlled to maintain in a substantially constant position the line or zone dividing the dry glass making materials from the molten glass of said bath, and means for supplying heat to the bath of glass.

15. Apparatus for making glass, comprising a tank for containing a bath of molten glass having a lateral wall of refractory material, at least a portion of which terminates adjacent to the normal level of the surface of the bath of glass in the tank, means for maintaining a mass of glass making materials in the space between the termination of such portion of the refractory lateral wall and the bottom of the tank extending from the level of the bottom of the glass bath to a level adjacent to the normal level of the surface thereof, including means for supplying glass making materials from outside the tank to augment the mass of said materials used in confining the bath of glass, means for confining the mass of glass making materials against movement outwardly of the tank, and a plurality of pusher means for moving the glass making materials inwardly of the tank disposed at different levels intermediate the bottom of the tank and the normal level of the surface of the bath of glass therein, whereby differential application of force by the several pusher means at the different levels may be operative to establish and maintain the line or zone dividing the dry glass making materials from the molten glass of said bath at a substantially constant position, and whereby undercutting of the glass making materials by the molten glass of said bath may be substantially prevented.

16. Apparatus for making glass, comprising a tank for containing a bath of molten glass having a depending lateral wall of refractory material at least a portion of which terminates adjacent to the normal level of the surface of the bath of glass in the tank, means for maintaining a mass of glass making materials in the space between the termination of such portion of the depending refractory lateral wall and the bottom of the tank extending from the level of the bottom of the glass bath to a level adjacent to the normal level of the surface thereof, an inwardly and downwardly directed wall portion disposed below the lower edge of the depending tank wall portion and above the bottom of the tank and out of contact in a vertical direction with both the bottom of the tank and the lower edge of the depending tank wall, means for supplying glass making materials to the mass above the inwardly and downwardly directed wall portion so that they will move by gravity inwardly and downwardly of the tank toward the interior thereof, an aperture in said inwardly and downwardly directed wall portion through which glass making materials may pass to the space therebeneath to establish a mass or wall of glass making materials separating the glass in the tank from the outside thereof, whereby the spaces between the inwardly and downwardly directed wall portion and the depending tank wall portion and between said inwardly and downwardly directed wall portion and the bottom of the tank are filled by glass making materials which serve to confine the molten glass in the tank, and reciprocable pusher means above and below such inwardly and downwardly directed wall portion for moving the glass making materials inwardly of the tank, so that the lines or zones between the glass making materials of the mass and the molten glass in the tank may be maintained substantially constant by control of the rate of inward movement of the glass making materials substantially to balance the rate at which such materials are melted by contact with the molten glass in the tank.

17. Apparatus for making glass, comprising a tank for containing a bath of molten glass having a melting end and a refining end, means for supplying combustion generated heat at least to the refining end of the tank above the surface of the glass therein, said tank having lateral glass confining walls of refractory material at least a portion of which has its lower termination above the level of the bottom of the tank, means for establishing a mass of glass making materials in the space between the lower termination of such portion of the refractory lateral walls and the bottom of the tank and extending a material distance toward the normal level of the surface of the molten glass in the tank to confine the molten glass within the desired confines in the tank and for supplying glass making materials to replenish the mass from outside the tank, a plurality of pusher means disposed in operative relation to the mass of glass making materials to exert pressure thereon to move the materials inwardly of the tank, and means for controlling the application of force by said pusher means to control the rate of inward movement of the glass making materials of the mass to maintain substantially constant the line or zone intermediate the molten glass of said bath and the dry glass making materials of the mass confining the bath.

GEORGE E. HOWARD.